(12) United States Patent
Swenson et al.

(10) Patent No.: US 9,160,624 B2
(45) Date of Patent: Oct. 13, 2015

(54) LINKED LIST SCRIPTING ENGINE

(71) Applicant: Skyfire Labs, Inc., Mountain View, CA (US)

(72) Inventors: Erik R. Swenson, San Jose, CA (US); Jaime Heilpern, San Francisco, CA (US)

(73) Assignee: Opera Software Ireland Limited, Dublin (IE)

( * ) Notice: Subject to any disclaimer, the term of this patent is extended or adjusted under 35 U.S.C. 154(b) by 288 days.

(21) Appl. No.: 13/935,415

(22) Filed: Jul. 3, 2013

(65) Prior Publication Data

US 2014/0012963 A1    Jan. 9, 2014

Related U.S. Application Data

(60) Provisional application No. 61/667,879, filed on Jul. 3, 2012.

(51) Int. Cl.
  *G06F 9/44*     (2006.01)
  *H04L 12/24*   (2006.01)
  *G06F 9/455*   (2006.01)

(52) U.S. Cl.
  CPC ........ *H04L 41/0813* (2013.01); *G06F 9/45512* (2013.01); *G06F 9/45508* (2013.01)

(58) Field of Classification Search
  None
  See application file for complete search history.

(56) References Cited

U.S. PATENT DOCUMENTS

| | | | | |
|---|---|---|---|---|
| 6,078,924 | A * | 6/2000 | Ainsbury et al. | 1/1 |
| 2003/0110151 | A1 * | 6/2003 | Fortier | 707/1 |
| 2004/0215627 | A1 * | 10/2004 | Whalen et al. | 707/100 |
| 2004/0221238 | A1 * | 11/2004 | Cifra et al. | 715/762 |
| 2005/0021502 | A1 * | 1/2005 | Chen et al. | 707/2 |
| 2005/0273755 | A1 * | 12/2005 | Bass et al. | 717/100 |
| 2006/0031663 | A1 * | 2/2006 | Peller et al. | 712/245 |
| 2006/0187849 | A1 * | 8/2006 | Hamedi | 370/252 |
| 2007/0083630 | A1 * | 4/2007 | Roth et al. | 709/223 |
| 2007/0198665 | A1 * | 8/2007 | De Matteis et al. | 709/220 |
| 2007/0274314 | A1 * | 11/2007 | Werber et al. | 370/392 |
| 2008/0163262 | A1 * | 7/2008 | He | 719/321 |
| 2010/0011013 | A1 * | 1/2010 | Singh | 707/101 |
| 2010/0011258 | A1 * | 1/2010 | Hom et al. | 714/49 |
| 2011/0153630 | A1 * | 6/2011 | Vernon et al. | 707/758 |
| 2012/0257255 | A1 * | 10/2012 | Rowson et al. | 358/1.18 |
| 2013/0318495 | A1 * | 11/2013 | Gardner | 717/111 |
| 2014/0053128 | A1 * | 2/2014 | Kuper et al. | 717/106 |
| 2014/0331201 | A1 * | 11/2014 | Adl-Tabatabai et al. | 717/106 |

OTHER PUBLICATIONS

"JSON" Wikipedia.org, Last Modified Oct. 28, 2013, 6 pages, [Online] [Retrieved on Oct. 28, 2013] Retrieved from the Internet<URL: http://en.wikipedia.org/wiki/Json>.

* cited by examiner

*Primary Examiner* — Isaac T Tecklu
(74) *Attorney, Agent, or Firm* — Fenwick & West LLP (57) ABSTRACT

A system and a method are creating a linked list scripts for a networking device. The system receives a set of nodes defining script functionality and generates a script by coupling the nodes in a nodal structure based on desired order of execution, wherein a leaf node is a standalone node with no child node, and wherein a nugget node includes one or more child nodes, each child node being a nugget or leaf node. The system then determines an execution path through a subset of nodes in the nodal tree structure based on one or more input values. The system also compiles the subset of nodes into a linked list of operations, which follows the execution path, and executes the path of operations within the compiled linked list of operations.

20 Claims, 7 Drawing Sheets

LINKED LIST SCRIPTING ENGINE

CROSS REFERENCE TO RELATED APPLICATIONS

This application claims the benefit of U.S. Provisional Application No. 61/667,879 filed on Jul. 3, 2012, which is incorporated by reference in their entirety.

BACKGROUND

1. Field of Art

The disclosure generally relates to a scripting engine for networking devices, and more specifically, to providing a scripting engine that enables an administrator to configure high performance networking devices with dynamic parameters.

2. Description of the Related Art

A scripting engine allows a programmer to program and change the run-time characteristics of a platform without custom software release with long development cycles. Existing scripting engines come in two forms, interpreted and compiled. Interpreted scripting engines interpret scripts at runtime and thus, often suffer from performance constraints. For example, interpreted scripting engines are not useful in a high-traffic server that handles thousands of connections per second.

One the other hand, compiled scripting engines may offer better performance, but the scripts must be compiled into native or byte code prior to execution time. Hence, the compiled scripting engines lack the flexibility to update the scripts without recompiling the entire program, which may be inconvenient for situations where dynamic configurations and frequent updates are required.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

A system and a method for creating a linked list for configuring and controlling networking devices from an editable scripting language structure are disclosed. The system comprises a scripting engine that receives a set of nodes having operations defining script functionality and generates a linked list along execution paths through the set of nodes by coupling adjacent operations according to a nodal structure defining an order of execution.

The scripting engine compiles a subset of nodes into a linked list of adjacent operations based on a set of input properties that follow a path of execution for determining a set of output properties. In response to receiving input values for the set of input properties, the scripting engine executes a path of operations within the compiled linked list based on the provided values to determine the set of output properties. The set of output properties may specify optimal optimization parameters for a particular item of online content such as a video. Further, the scripting engine may receive new nodes inserted, or for insertion into the nodal structure. The updated nodal structure may be analyzed by the scripting engine to determine changes in one or more execution paths through the compiled linked. In turn, the scripting engine may compile the new nodes for insertion into the linked list according to the desired changes in the paths of execution. Alternatively, a new linked list may be compiled from the updated nodal structure.

In one embodiment, the scripting engine compiles scripts into a linked-list structure that can be parsed and efficiently executed (e.g., in run-time). The linked-list structure is extensible and the performance may be predicted according to one or more rules. For example, network flows for delivering online content can be selectively monitored and optimized on-demand based on the type of the content, such as video, carried in a given flow, devices involved in the flow, and status of the network element supporting the flow.

Real-Time Traffic Monitoring

Figure 1:
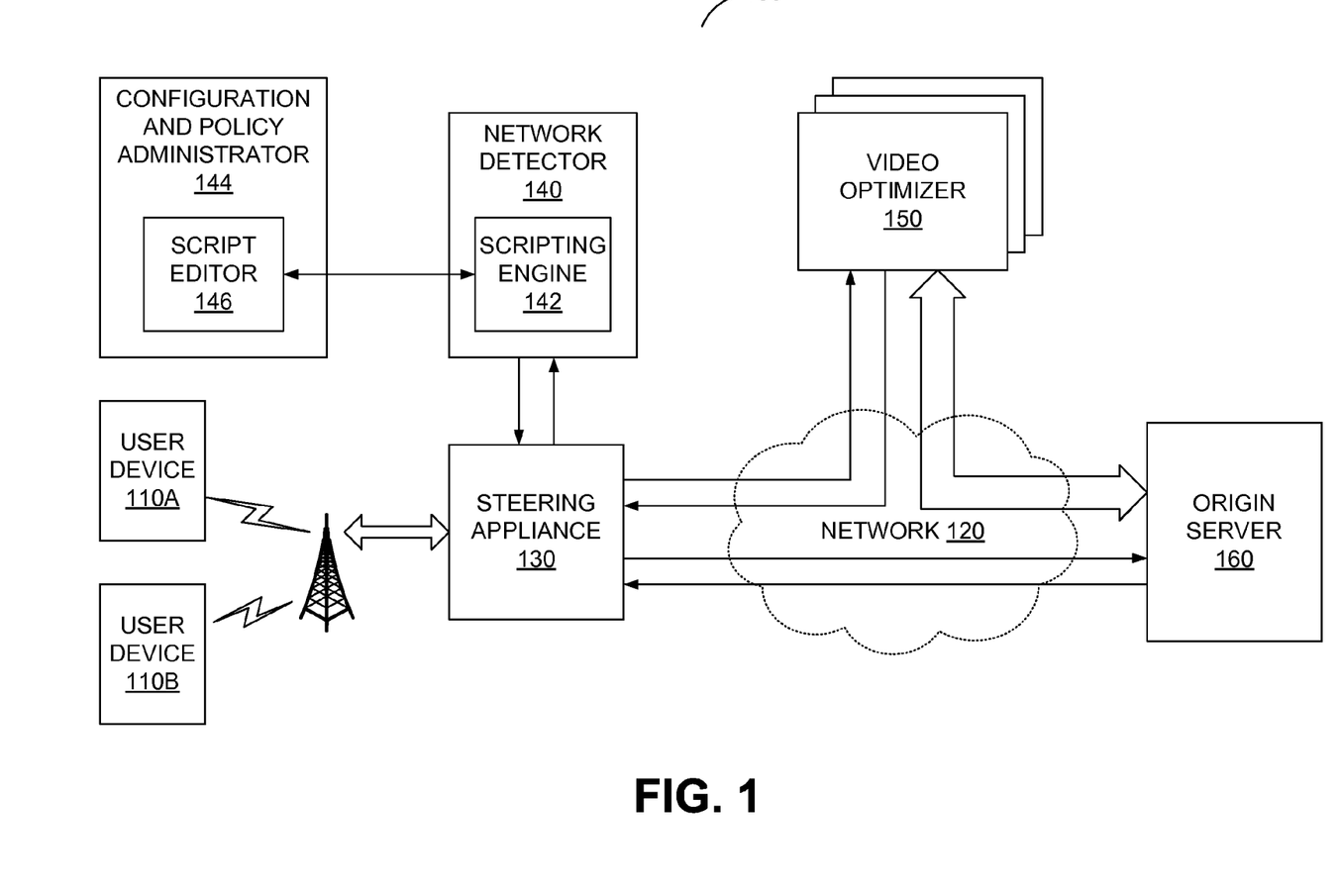
FIG. 1 illustrates a block diagram of an example environment for implementing a scripting engine to manage on-demand real-time network monitoring and video optimization.

Turning now to FIG. 1, it illustrates a block diagram of an example environment 100 for implementing a scripting engine to manage on-demand real-time network monitoring and video optimization. The environment 100 demonstrates a solution that provides a unified foundation with deep session intelligence, integrated services management, and dynamic adaptability to fit a variety of service offerings, such as optimization of network flows for delivering video content. The environment 100 comprises user devices 110, an origin server 160, a steering device 130, a network controller 140, a video optimizer 150, and a network 120. Together, the network controller 140 and the video optimizer 150 deliver a media optimization solution that brings a surgical capacity advantage to wireless operators as well as Internet service providers with better peak capacity savings than alternative solutions.

The network 120 is a communication network that transmits data between the user devices 110, the steering device 130 and the origin server 160 and/or the video optimizer 150. In one embodiment, the network 120 includes wireless network and the Internet.

In one embodiment, the user devices 110 are computing devices with network capabilities. Oftentimes, for example, the user devices 110 are wireless enabled mobile computing device with a web browser and media display capability. The user devices 110 as mobile computing devices may include laptops, netbooks, tablets, smart telephones, or personal digital assistants (PDAs). While only two user devices 110A and 110B are illustrated in FIG. 1, the environment 100 may include thousands or millions of such devices. The web browsers may be software applications running on mobile devices 110 for retrieving web content from the origin server 160 and presenting the web content on a display coupled to the mobile device. Web content accessed by the user devices 110 includes text, images, audio and video content. The multimedia content can be played back by the browsers, for example, HTML5 compatible browsers, plug-in or a standalone media player. The browsers can also invoke the media players or plug-ins available on the user devices 110 and passes images, audio and/or video to the media player or plug-in for playback.

The steering device 130 may be a load balancer or a router located between the user device 110 and the network 120. The steering device 130 provides the user device 110 with access to the network and thus, provides the gateway through which the user device traffic flows onto the network and vice versa. In one embodiment, the steering device 130 categorizes traffic routed through it to identify flows of interest for further inspection at the network controller 140. The network controller 140 interfaces with the steering device 130 to configure the monitoring and categorization of network traffic, such as identifying large and small objects in HTTP traffic flows. For example, the steering device 130 receives instructions from the network controller 140 based on the desired criteria for categorizing flows of interest for further inspection. In one embodiment, the instructions are provided in a linked list generate by a scripting engine 142. In turn, the steering appliance 130 may categorize an inspected flow for further inspection at the network detector 140. In an alternative embodiment, the network detector 140 may specify sets of input properties, that when identified for a flow through the steering appliance 130, are provided to the network detector 140 for analysis.

The network detector 140 monitors the condition of the network based on the flows identified for further inspection and corrects for network congestion without the mobile user's knowledge. For example, in one embodiment, the network controller 140 is an "out-of-band" computer server that interfaces with the steering device 130 to selectively inspect user flows of interest. The network controller 140 may further identify user flows (e.g., among the flows of interest) for optimization. When queried by the steering device 130, the network controller 140 may determine if a given network flow should be ignored, monitored further or optimized. The network controller 140 uses the network state as well as historical traffic data in its decision for monitoring and optimization. Knowledge on the current network state, such as congestion, deems critical when it comes to data optimization.

The operation of the network detector 140 can be automated and managed by a script engine 142 so that network can be optimized for end user's experience. A configuration and policy administrator 144 system is typically configured with a script editor 146 that interfaces with the scripting engine 142 to implement policy and operational changes within the network 120. For example, a network administrator may input and edit scripts that configure and control the various operations of the steering appliance 130, network detector 140, and video optimizer 150 using the configuration and policy administrator 144 system. In one embodiment, a script comprises a small number of objects and/or operations that form a given node in an organized nodal tree structure. The structure of the tree defines a path of execution through the various nodes (e.g., which scripts should be executed) based on provided input variables (e.g., associated with a flow). Non-tree structures may also be used. A scripting engine, such as scripting engine 142 on the network detector 140 parses and compiles the scripts into a linked list of operations based on desired order of execution. The compiled linked list of operations can then be executed by the scripting engine 142 to automate and manage the network detector 140 to provide network monitoring and video optimization functionalities. Other entities such as the steering appliance 130 and video optimizer 150 may also execute compiled linked lists of operations to perform ascribed functionality.

When a flow is sent to the network controller 140 for inspection, a number of properties and their corresponding values for inputting to the script engine 142 may be identified from flow information. For example, information collected for the flow may indicate a type of content (e.g., image or video), a URL and/or associated domain, network elements associated with the flow, subscriber device type and device operating system among other parameters. Properties and their corresponding values may also be identified from historical network traffic data associated with the flow and stored at the network controller 140. The historical network traffic data may include information such as subscriber flow trends for the user and other users utilizing same network elements, time-of-day statistics for the cell towers to which the user devices attached and routers through which the traffic is passing, geography regions and the backhaul segments. For example, in a mobile network, history for the cell tower to which a user device is attached can be useful, since it is the location where most congestion occurs due to limited bandwidth and high cost of the radio access network infrastructure. The script engine 142 may, in turn, determine the average of the bandwidth per user at the particular cell tower and estimate the amount of bandwidth or degree of congestion for the new flow based on the received flow information.

Further, the script engine 142 may output optimization parameters for the flow based on the estimate amount of bandwidth or degree of congestion for the new flow. In turn, the network controller 140 may redirect the flow through the video optimizer 150 for optimization. In one embodiment, the network controller 140 generates a redirect request configured to cause a user device to connect to a video optimizer 150. The redirect request may include optimization parameters and information (e.g., a URL) identifying flow content for optimization by the video optimizer 150 based on the optimization parameters.

The video optimizer 150 is a computer server that provides video and image optimization and delivers optimized video and image content to the user devices 110 via the network 120. The video and image optimization is an on-demand service provided through the transcoding of the video and image content. For example, when a user device attempts to retrieve video from the origin server 160, the network controller 140 may decide that the flow meets certain criteria for content optimization. The script engine 142 processes flow information to generate optimization parameters. The network controller 140 then redirects the user device 110 to the video optimizer 150 to retrieve the optimized content. The video optimizer 150 receives optimization and flow information in the redirect request from the user devices 110 or from the network controller 140 about the video or image content and parameters for optimizing the content. In turn, the video optimizer 150 may retrieve the video or image content from the corresponding origin server 160 for optimization and subsequent delivery to the user devices 110.

The video optimizer 150 and the origin server 160 are each typically formed of one or more computers. While only one server of each video optimizer 150 and origin server 160 is shown in the environment 100 of FIG. 1, different embodiments may include multiple web servers and video servers operated by a single entity or multiple entities. In other embodiments, a single server may also provide different functionalities, such as delivering web content as a web server, as well as serving optimized video content.

Computing Machine Architecture

Figure 2:
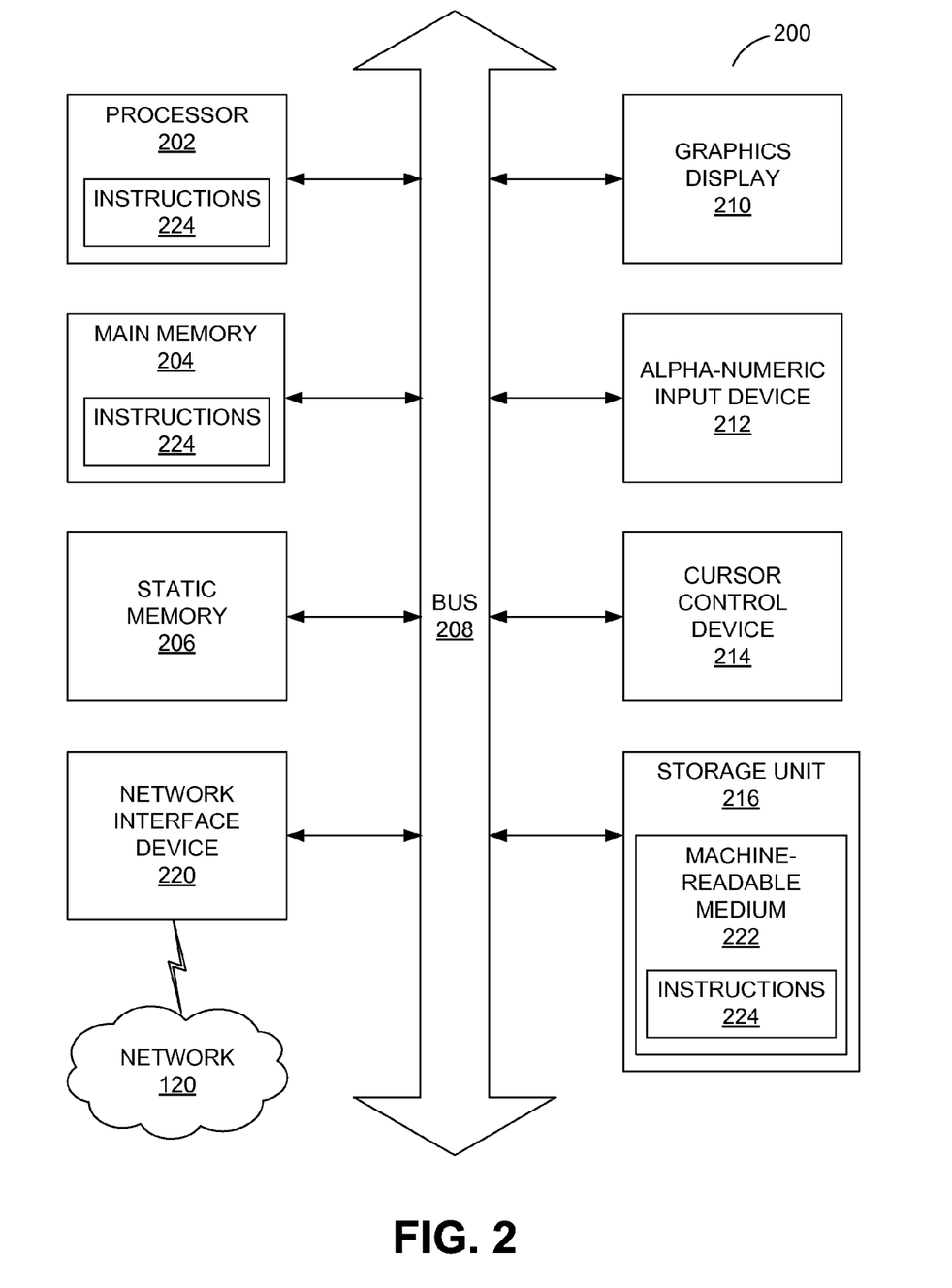
FIG. 2 illustrates one embodiment of components of an example machine able to read instructions from a machine-readable medium and execute them in a processor (or controller).

FIG. 2 is a block diagram illustrating components of an example machine able to read instructions from a machine-readable medium and execute them in a processor (or controller) to implement the disclosed system for on-demand real-time network monitoring and subscriber identification. Specifically, FIG. 2 shows a diagrammatic representation of a machine in the example form of a computer system 200 within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smart phone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes one or more processors 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 120 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

System Components of Scripting Engine

Figure 3:
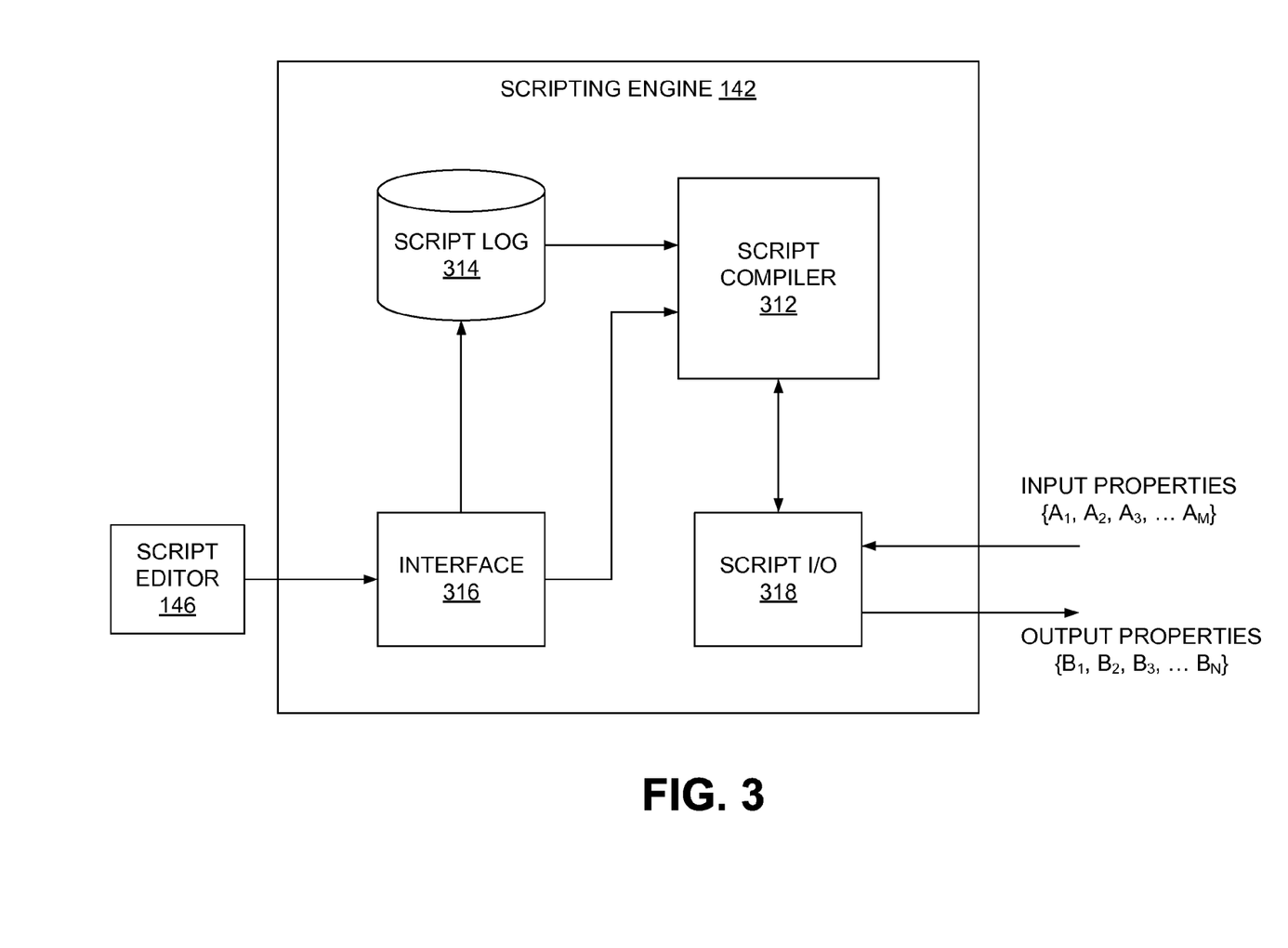
FIG. 3 illustrates one embodiment of an example architecture of a scripting engine for configuring and controlling network elements used for on-demand real-time network monitoring and video optimization

FIG. 3 illustrates one embodiment of an example architecture of a scripting engine 142 for configuring and controlling network elements used for on-demand real-time network monitoring and video optimization. The scripting engine 142 comprises a script compiler 312, a interface 316, a script I/O 318, and a script log 314. In other embodiments, the scripting engine 142 may include additional, fewer, or different components for various applications. Conventional components such as network interfaces, security functions, failover servers, management and network operations consoles, and the like are not shown so as to not obscure the details of the system architecture.

The interface 316 communicates with an external script editor 146 to provide network administrators with an interface for efficiently creating and editing scripts. The script compiler 312 parses and compiles the scripts into a linked list of operations for execution. The script I/O receives input values for a set of input properties (e.g., $\{A_1, A_2, A_3, \ldots A_m\}$) of the script and generates a set of outputs properties (e.g., $\{B_1, B_2, B_3, \ldots B_n\}$) after executing a compiled script based on input values. The script log 314 stores versions and copies of scripts input and edited by the network administrators, intermediate nodal tree structures, linked lists compiled from scripts, the runtime log of the linked lists, as well as the execution outcome and system errors.

In one embodiment, the scripting engine 142 is based on JavaScript Object Notation (JSON), which is a lightweight scripting schema for defining objects. Unlike languages such as Tool Command Language (TCL) etc., lightweight scripting schemas, such as JSON, do not require complex rules and parsers. There can be multiple scripts in the system, and new scripts can be added or inserted into existing scripts at any time. Note that embodiments of the scripting engine can be used with any scripting language, such as TCL, and Perl etc. For example, to evaluate a JSON script, the script compiler 312 analyzes the script from top to bottom and generate an output or function compatible with a given language.

Each execution session of a complied script may run in its own instance, or sandbox, using a set of initial system states that provide the basis for computing values for output properties based on received input values. For example, the scripting engine 142 can spawn multiple instances for a script created for determining whether to monitor an incoming flow and/or to optimize the video. In response to a notification from the steering appliance, a new instance of the script will be invoked to inspect a number of properties and their corresponding values of the incoming flow, such as type of content (e.g., image or video), URL and/or associated domain, subscriber device type and device operating system among other parameters, to make a decision on whether to monitor the flow and/or optimize the video. Depending on the input properties and their corresponding values of the incoming flows, the multiple instances of the scripts may follow same or different execution paths and generate same or different output properties. Some variables and functions may be read only while other may be modified. For example, the state of the system may be set to a default state for each session to establish read-only functions and variable. The scripting engine 142 can then modify writeable variables during execution. Some variables, such as a profile, configuration and status variables, may be guaranteed to exist and are initialized at the start of each execution. Session variables such as HTTP referrer headers and controller API fields may be optional or determined during script execution.

One or more JSON scripts can be parsed and loaded by the script compiler 312 when the scripting engine service starts, and the service's configuration can be optionally reloaded at anytime. The JSON scripts may be organized in a tree structure governed by rules that define their order of execution and whether they are executed at all based on the values of input properties. For example, a particular script may only be executed if conditions for its execution are met (e.g., based on the value of a particular property). Other scripts, such as an initialization script that sets global and session variables may always be executed. In one embodiment, the script compiler 312 functions as a JSON validator to ensure that scripts specified for execution are syntactically correct prior to starting the scripting service and compiling the scripts. For example, as the service may not start if there is an error in the JSON, the validator ensures correctness of the scripts and may request error fixes or otherwise notify the script editor 146 about detected errors after the network administrator finish editing. The scripts are compiled into a linked list structure as they are read and thus, instructions are executed along the script path. Accordingly, structures/variables embedded within unused nodes are not executed. The resulting operation is similar, for example, to an execution path through several if-then-else constructs where one of the paths through the scopes will get executed.

Example Linked List Construct

Figure 4A:
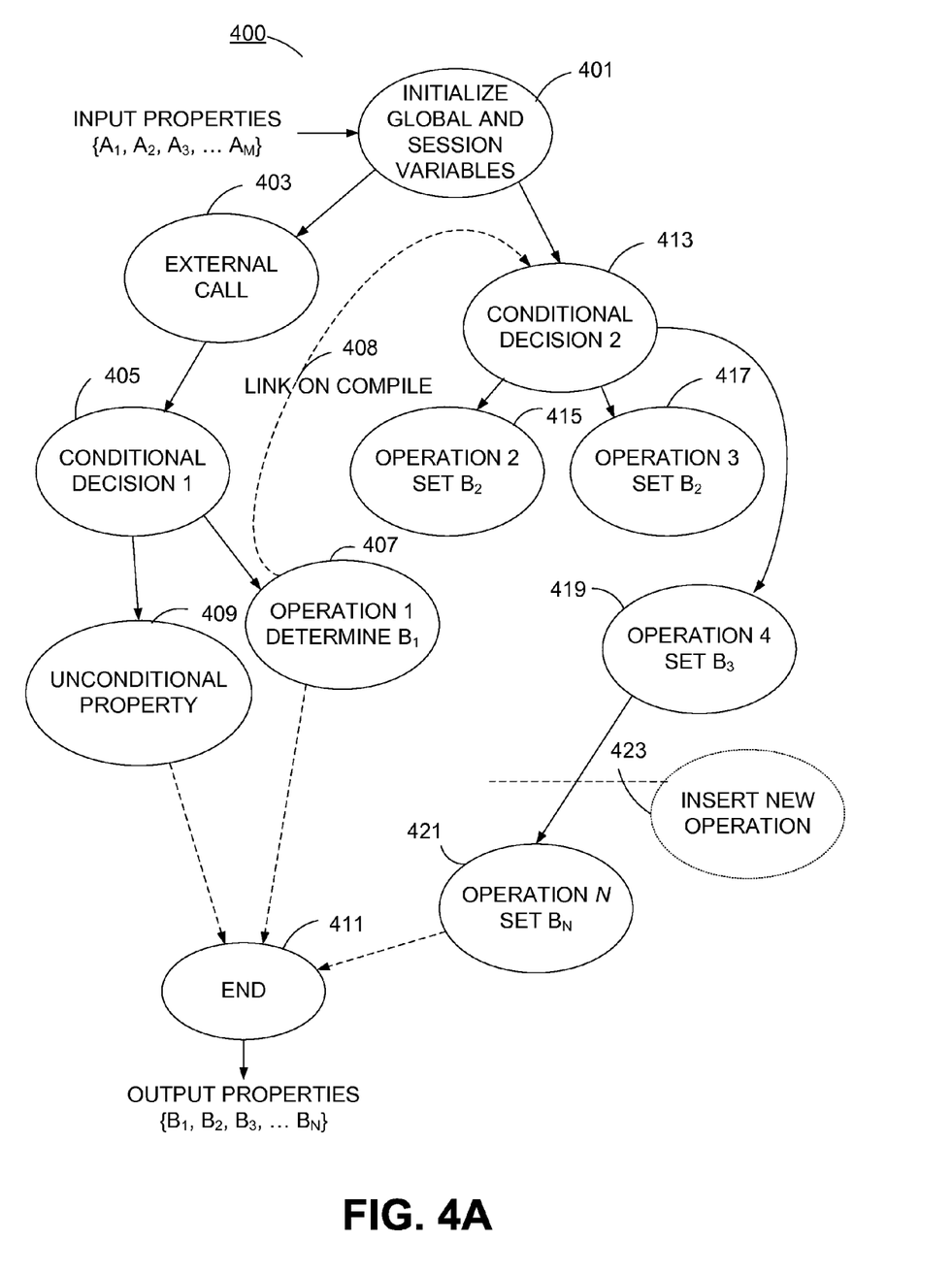
FIGS. 4A-4B illustrate one embodiment of an example scripting language structure and corresponding linked list construct for executing an example script once compiled by the scripting engine.
Figure 4B:
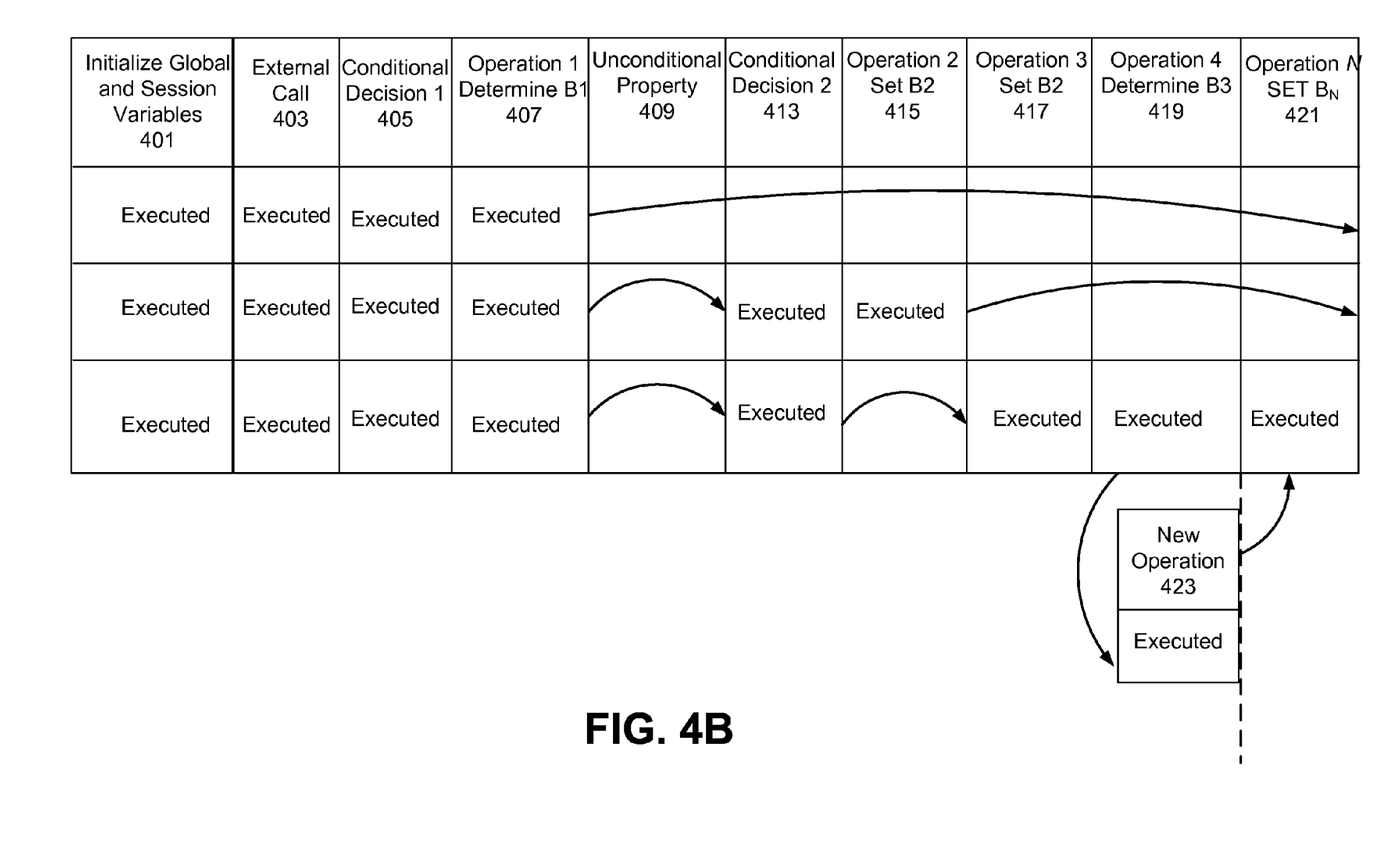

Referring now to FIGS. 4A and 4B, scripting language structure and corresponding linked list construct for executing an example script once compiled by the scripting engine 142. In one embodiment, the example script structure 400 shown in FIG. 4A is created, and optionally edited with the script editor 146 by the policy administrator 144. The script 400 configures and controls the functionalities of the network detector 140 for providing real-time network monitoring and video optimization. The script structure 400 receives values for input properties $\{A_1, A_2, \ldots A_m\}$, sets system variables, performs various operations, compared the properties against conditional variables or regular expressions, and generates values for outputs properties $\{B_1, B_2, \ldots B_n\}$. Input properties may, for example, describe a source video, user device, and condition of the network. The script 400, in turn, is compiled and executed to generate values for output properties describing how the video optimizer 150 should transcode the source video.

In one embodiment, an operation or an object (e.g., a node) in the script structure 400 can be either a nugget or a leaf. In the scripting language, a nugget object is encompassed by a pair of curly braces { } and includes one or more children objects, each of which can be a nugget or a leaf object itself The pair of curly braces are scope operators that indicate the beginning and end of a nugget object. A nugget may have a name that retains a constant value, for example, "DefaultProfile" or "MP4BlackList," and one or more attributes. The following nugget definition shows an example nugget that unconditionally sets two variables Profile.VideoBitrate to 150 and Profile.AudioStereo to False. For example in FIG. 4A, node 409 is such a nugget that sets properties unconditionally.

```
"DefaultProfile"
{
    "Profile.VideoBitrate" : "150",
    "Profile.AudioStereo": "False"
}
```

A top level nugget of a script may also include a "ConfigVersion" to indicate its version and compatibility with other scripts. A nugget may include any number of child nuggets and/or leaves within the nugget's scope { }. In one embodiment, a nugget allows 128 levels of child nugget hierarchy as a practical limit to insure flatter execution, since nuggets are processed similar to an "if-then-else" structure, i.e., once a nugget at a given level of hierarchy is processed, multiple other nuggets at the same level of hierarchy may be skipped.

On the other hand, a leaf object does not have any child object and is located at the lowest level of hierarchy. A leaf of a nugget is evaluated if the nugget itself is evaluated in the if-then-else structure. Examples of leaf objects include keywords and variables settings. Variable assignment may occur multiple times in the scripts. For example, as the flow of the script progresses, each assignment may be used for subsequent logic until another assignment changes the value. To get the value of a system variable or a session variable that has been initialized earlier in the scripts, a "$"symbol is put in front of the variable so the scripting engine knows it is a variable reference, not a string or a text value, e.g. $Profile.VideoBitrate represents the value of the variable Profile.VideoBitrate. A leaf may also perform a comparison operation, in which the object within the scope is evaluated by comparison. The following leaf definition illustrates a simple string comparison. Such a leaf operation is shown in node 407 in FIG. 4A to indicate whether the video source is MP4.

```
"_Key_": "$Session.VideoSrcType",
    "MP4":
    {
        "Profile.IsMP4InterceptExcluded" : "True"
    }
```

The following example shows a script that performs a regular expression match. In this operation, the session's SMIL URL is used as the key to compare against input URL properties. Each first-level nugget within the scope of the "_RegExKey_" has its value compared to the key using a regular expression match. The first value to match (e.g., in order from top to bottom) will halt the operations. This type of conditional decision with two branch child operations is shown in FIG. 4A, for example, by conditional decision node 413 and child nuggets 415 and 417. The sequence below, for example, checks the domain corresponding to the source video and whether video for that domain should be optimized.

```
"SMILBlacklist":
{
    "_RegExKey_" : "$Session.SmilURL",
    "crackle\\.com" :
    {
        "Profile.IsSMILBlacklisted": "True"
        "Profile.Optimize" : "False"
    }
    "si\\.com" :
    {
        "Profile.IsSMILBlacklisted": "True"
        "Profile.Optimize" : "False"
    }
}
```

A script may have a main entry point and one or more sub entry points for executing the script. The example script structure 400 has a main entry point 401, which initializes global and session variable of the system such as the values for input properties $\{A_1, A_2, A_3, \ldots A_m\}$. The main entry point 401 can be a script file identified by the configuration and policy administrator 144. The main entry point 401 may additionally include other scripts by declaring them as "externals" in the main script. An external script can be accessed using a "_Extern_" keyword followed by the name of the script file to be used. For example, an external script can be called by "_Extern_: Do.Something." Externals may also be used as entry points by a calling application.

Similarly, the keyword _File_ specifies a external filename with relative paths. The keyword _ExternalDependencies_ also allows linking of external scripts into the main script. For example, the external call 403 may call on an external black list of URLs using the following script:

```
"_ExternalDependencie_":
{
    "_File_" : "URLBlackList.config"
},
"Blacklists":
{
    "_Extern_": "URLBlacklist"
}
```

Additional operations for logging information during script execution may be performed using a _Log*_ keyword. The scripting engine allows the system to log information at a log level specified by the _LogError_, _LogWarn_, _LogStats_, _LogInfo_, _LogDebug_ keywords. For example:

```
"_Key_": "$Session.VideoSrcType",
"MP4":
{
    "_LogError_": "MP4 Encountered"
}
```

In one embodiment, examples of functions supported by the scripting engine may include the following:
  _absent_ Matches when the key is not present
  _BitwiseAndKey_ Bitwise AND comparison
  _GreaterThanKey_/_LessThanKey_ Numeric comparison
  _Extern_ Call to execute an external file
  _ExternalDependencies_ When used in a name of a node, retrieves external files
  _File_ Name of the file key for an _ExternalDependencies_
  _InTimeRange_ Evaluation value if the _TimeKey_ is within the _TimeRangeStart_ and _TimeRangeEnd_
  _Key_ String/value comparison
  _Label_ Set a node name
  _LogError_, _LogWarn_, _LogStats_, _LogInfo_, _LogDebug_ Log state
  _RegExKey_ Expression comparison
  _TimeKey_ Time comparison
  _TimeRangeEnd_ End time, used for time comparison in format hh:mm:ss,
  _TimeRangeStart_ Start time, used for time comparison in format hh:mm:ss.

Examples of profile variables that describe optimization properties for configuring and controlling the operation of video optimizations at the network detector 140 comprise:
  Profile.AudioSampleRate Denotes audio sample rate for the optimized video
  Profile.AudioStereo States whether the audio is stereo or mono
  Profile.EnableABRTranscode States whether adaptive bitrate optimization should occur
  Profile.ImageOptimize States whether image optimization should occur
  Profile.ImageQuality Denotes quality percentage for an optimized image
  Profile.IsMP4InterceptExcluded States whether MP4 video optimization should occur
  Profile.IsSMILBlacklisted States whether video optimization based on Synchronized Multimedia Integration Language (SMIL) description of the video should occur
  Profile.IsURLBlacklisted States whether video optimization based on URL should occur
  Profile.Name Denotes profile names used for analytics
  Profile.Optimize States whether video optimization should occur
  Profile.VideoBitrate Denotes bitrate for the optimized video
  Profile.VideoHeight Denotes height for the optimized video
  Profile.VideoWidth Denotes width for the optimized video
  Profile.FileSize Denotes size of the received file in bytes
  Profile.PerFlowCongestionUsed States whether the congestion level was estimated from the flow
  Profile.CongestionLevel Denotes the congestion level used for optimizing this flow Examples of configuration, status, and session variables that can be included in the script comprise:
  Config.GlobalCongestionLevel Integer denoting congestion level
  Config.LogLevel Current Log Level of the script log 314
  Status.OptimizerOnline Indicates whether the selected video optimizer for the flow is online (or should be brought online)
  Session.CurrentTime Current time, hh:mm:ss
  Session.HTTP.Request<HEADER> Any key value contained in the request (such as User-Agent) is available
  Session.HTTP.RequestURL URL of the http request (e.g., of a video for optimization)
  Session.HTTP.Response.<HEADER> Any key value contained in the response is available
  Session.VideoSrcType Source type of the video such as FLV, MP4, UNKNOWN
  Session.ImageSrcType Source type of the image such as JPEG, PNG, UNKNOWN
  Session.ControllerAPI.APIVersion Version of an API
  Session.ControllerAPI.Policy
    Session.ControllerAPI.Policy.CongestionLevel Current global congestion level Session.ControllerAPI.Policy.Flags Policy flags for the API
Session.ControllerAPI.VideoMetaData
Session.ControllerAPI.VideoMetaData.Flags Flags for the video meta data
Session.ControllerAPI.VideoMetaData.SourceBitrate Source bitrate of the unoptimized video
Session.ControllerAPI.VideoMetaData.TargetBitrate Target bitrate for the optimized video As the script structure 400 comprising a number of JSON scripts or any other lightweight script format is parsed and compiled, new linked list entries are created for each nugget and leaf in the order in which they will be executed. Each linked list entry has a list of children (which can be empty). In one embodiment, when parsing the tree-structured script 400, the operation sequence of the script follows a depth-first, pre-order traversal starting with the entry point and left subtree first then the right subtree. For example, a compile linked list of operations my follow link 408 from the operation 407 to the conditional decision 413 in FIG. 4A. FIG. 4B illustrated three execution linked lists compiled from the script 400. For example, the bottom linked list operates from nuggets 401→403→405→407→413→417→419→421. Note that a new operation 423 can be inserted by adding a new nugget later, therefore after compilation, the linked list becomes: 401→403→405→407→413→417→419→423→421.

Figure 5:
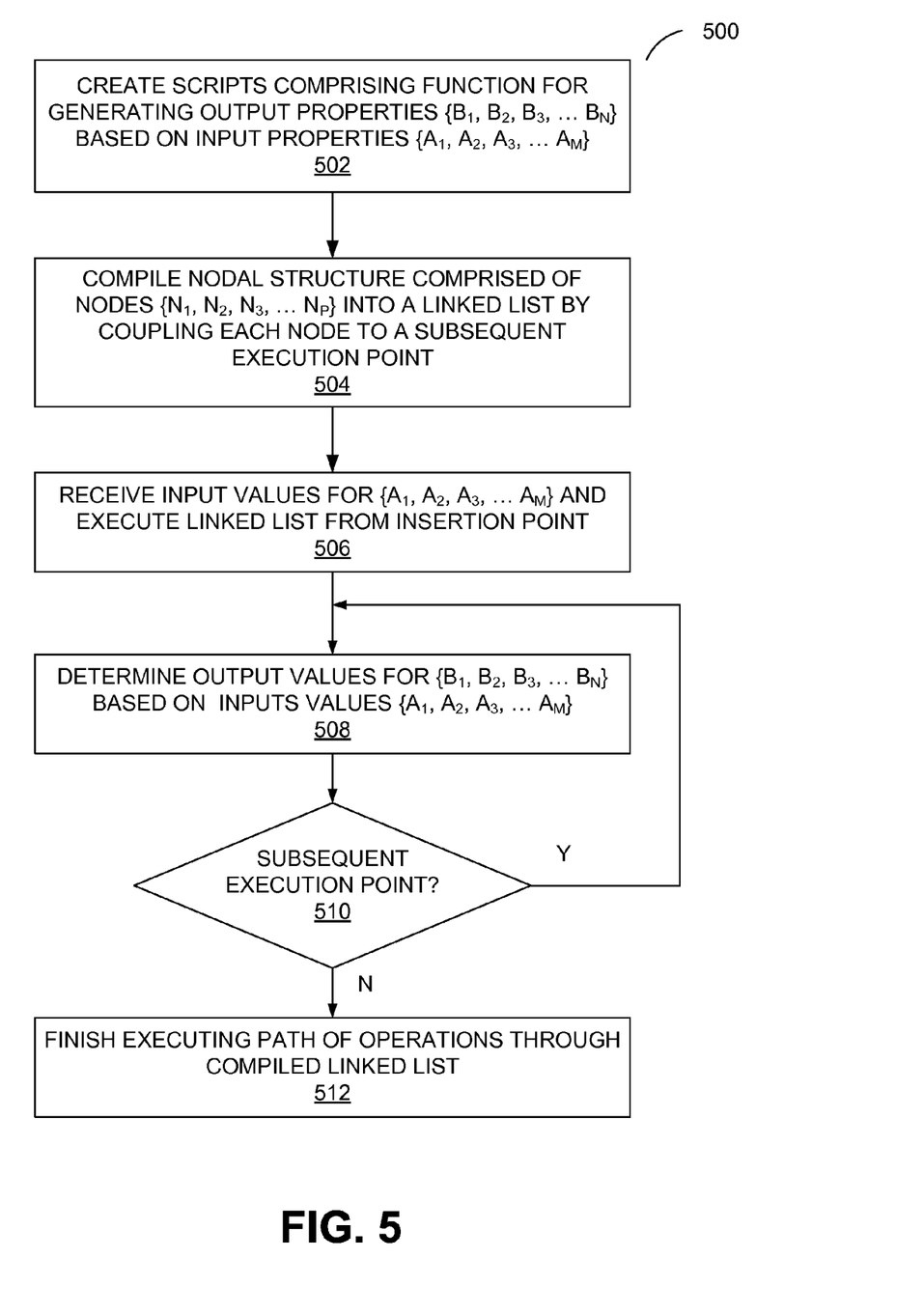
FIG. 5 illustrates one example embodiment of a process for compiling a scripting language structure into a linked list of operations for execution by the scripting engine.

FIG. 5 is a flowchart illustrating one embodiment of an example process 500 of compiling scripts into a linked list of operations for execution by the scripting engine. The process begin at step 502 by creating scripts comprising functions for generating output properties $\{B_1, B_2, B_3, \ldots B_n\}$ of the networking device based on input properties $\{A_1, A_2, A_3, \ldots A_m\}$. The scripts are organized in a nodal structure comprising a number of nodes based on a desired order of script execution. For example, each node in the structure may comprise a script defining operations of the network device, such as settings system variables and conditional operations based on the input properties and global constructs, and the node itself may be coupled to a number of other nodes whose operations precede or succeed those in the script. The nodal structure can be organized in a tree structure and when compiled, the process 500 generates a linked list of compiled nodes (or scripts) by coupling each node to a subsequent execution point in the list of operations in step 504.

In step 506, the scripting engine 142 receives input values for the properties $\{A_1, A_2, A_3, \ldots A_m\}$. In step 508, the scripting engine 142 proceeds through the linked list to determine output values for the output properties $\{B_1, B_2, B_3, \ldots B_n\}$ of the controlled network device based on the input values. After executing a node in the linked list, the scripting engine 142 next checks whether a subsequent execution point exists in step 510. If subsequent execution exists, the scripting engine continues to determine further output values for the output properties $\{B_1, B_2, B_3, \ldots B_n\}$. Otherwise, the scripting engine finishes the current executing path of operations through the compiled linked list in step 512.

Figure 6:
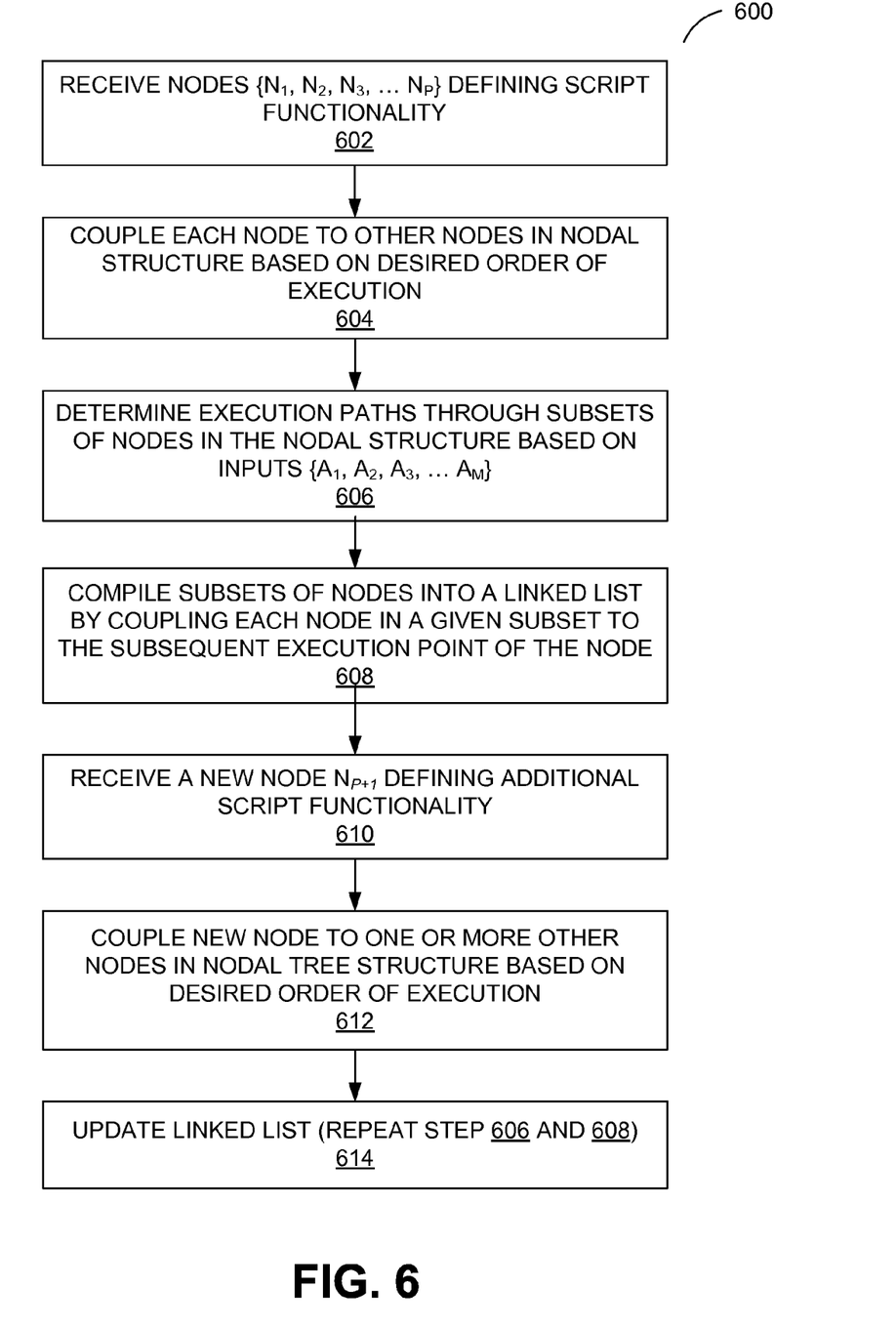
FIG. 6 illustrates one example embodiment of a process for inserting a new operation into a linked list of operations by the scripting engine.

FIG. 6 is a flowchart illustrating one embodiment of an example process 600 of inserting a new operation into a linked list of operations by the scripting engine 142. The process begin at step 602 by receiving a set of nodes $\{N_1, N_2, N_3, \ldots N_p\}$, each comprising a script defining functionality for configuring and controlling a network device. The script engine then couples each node to other nodes in a nodal tree structure based on desired order of execution in step 604. In step 606, the script engine determines execution paths through subsets of nodes in the nodal structure based on input properties $\{A_1, A_2, A_3, \ldots A_m\}$. When compiled by the scripting engine in step 608, each node is coupled to its subsequent execution point in a linked list of operations. When the scripting engine receives a new node $N_{P-1}$ defining additional script functionality in step 610, the scripting engine couples the new node to one or more other nodes in the nodal tree structure based on desired order of execution of the addition operation in step 612, and update the linked list by repeating step 606 and 608, i.e., determining an execution path involving the new node, compiling the node, coupling existing nodes that subsequently execute the new node to the new node, and coupling the new node to its subsequent execution point in the linked list.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors 102) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods (e.g., as described with FIGS. 4A, 4B, 5, and 6) described herein may be performed, at least partially, by one or more processors (e.g., processor 102) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory 104). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing interactive video ad with an HTML underlay through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for creating a linked list for executing a plurality of scripts on a networking device, the method comprising:

receiving a set of nodes, each comprising a script defining functionality of the networking device, the set of nodes including at least one of a leaf node that is an standalone node with no child node and a nugget node that includes one or more child nodes, each child node being a nugget or leaf node;

generating a script by coupling the nodes in a nodal structure based on desired order of execution;

determining an execution path through a subset of nodes in the nodal structure at least in part based on one or more input values of defined input properties;

compiling, by a processor, the subset of nodes into a linked list of operations, the linked list following the execution path; and executing the path of operations within the compiled linked list of operations.

2. The method of claim 1, wherein a script defining functionality of the networking device sets at least one of: a pre-defined system keyword, a configuration variable, a status variable, and a session variable.

3. The method of claim 1, wherein the input value of the input property is at least one of: a number, a string, a Boolean value, and a null.

4. The method of claim 1, wherein a node in the nodal tree structure comprises an operation to get or set a value of an output property.

5. The method of claim 1, wherein the nugget node in the nodal structure comprises a comparison operation of a variable to a particular value or a regular expression, the nugget node being executed in response to the comparison.

6. The method of claim 1, wherein a child node in the nodal structure represents a next operation following a parent object of the child object, wherein the next operation is conditioned on a determined value of the parent object when executed in the linked list.

7. The method of claim 1, wherein a predetermined depth limit is defined for levels of hierarchy in the nodal structure.

8. The method of claim 1, wherein the script includes a main entry point and one or more sub entry points for executing.

9. The method of claim 1, wherein one or more external scripts or files are called in a node.

10. The method of claim 1, further comprising:

receiving a new node defining additional script functionality;

coupling the new node to one or more other nodes in the nodal structure based on desired order of execution of the new node; and updating the linked list of operations following the execution path.

11. A non-transitory computer-readable storage medium storing executable computer program instructions for creating a linked list for executing a plurality of scripts on a networking device, the computer program instructions comprising instructions for:

receiving a set of nodes, each comprising a script defining functionality of the networking device, the set of nodes comprising at least one of a leaf node that is an standalone node with no child node and a nugget node that includes one or more child nodes, each child node being a nugget or leaf node;

generating a script by coupling the nodes in a nodal structure based on desired order of execution;

determining an execution path through a subset of nodes in the nodal structure at least in part based on one or more input values of defined input properties;

compiling, by a processor, the subset of nodes into a linked list of operations, the linked list following the execution path; and executing the path of operations within the compiled linked list of operations.

12. The non-transitory computer-readable storage medium of claim 11, wherein a script defining functionality of the networking device sets at least one of: a pre-defined system keyword, a configuration variable, a status variable, and a session variable.

13. The non-transitory computer-readable storage medium of claim 11, wherein the input value of the input property is at least one of: a number, a string, a Boolean value, and a null.

14. The non-transitory computer-readable storage medium of claim 11, wherein a node in the nodal tree structure comprises an operation to get or set a value of an output property.

15. The non-transitory computer-readable storage medium of claim 11, wherein the nugget node in the nodal structure comprises a comparison operation of a variable to a particular value or a regular expression, the nugget node being executed in response to the comparison.

16. The non-transitory computer-readable storage medium of claim 11, wherein a child node in the nodal structure represents a next operation following a parent object of the child object, wherein the next operation is conditioned on a determined value of the parent object when executed in the linked list.

17. The non-transitory computer-readable storage medium of claim 11, wherein a predetermined depth limit is defined for levels of hierarchy in the nodal structure.

18. The non-transitory computer-readable storage medium of claim 11, wherein the script includes a main entry point and one or more sub entry points for executing.

19. The non-transitory computer-readable storage medium of claim 11, wherein one or more external scripts or files are called in a node.

20. The non-transitory computer-readable storage medium of claim 11, further comprising:

receiving a new node defining additional script functionality;

coupling the new node to one or more other nodes in the nodal structure based on desired order of execution of the new node; and updating the linked list of operations following the execution path.

* * * * *